United States Patent
Kim et al.

(10) Patent No.: US 9,516,682 B2
(45) Date of Patent: Dec. 6, 2016

(54) DEVICE FOR PROVIDING WIRELESS COMMUNICATION-BASED UNIVERSAL SERIAL BUS SERVICE AND ASSOCIATED CONNECTION MANAGEMENT METHOD

(71) Applicant: Samsung Electronics Co., Ltd., Gyeonggi-do (KR)

(72) Inventors: Jun-Hyung Kim, Gyeonggi-do (KR); Mayuresh Madhukar Patil, Bangalore (IN); Jong-Hyo Lee, Gyeonggi-do (KR); Ji-Hye Lee, Seoul (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/797,808

(22) Filed: Jul. 13, 2015

(65) Prior Publication Data

US 2015/0319791 A1 Nov. 5, 2015

Related U.S. Application Data (63) Continuation of application No. 14/055,419, filed on Oct. 16, 2013, now Pat. No. 9,084,236.

(30) Foreign Application Priority Data

Apr. 1, 2013 (KR) .......................... 10-2013-0035407

(51) Int. Cl.
*G06F 3/00* (2006.01)
*G06F 13/12* (2006.01)
(Continued)

(52) U.S. Cl.
CPC ............ *H04W 76/02* (2013.01); *G06F 13/385* (2013.01); *G06F 13/4282* (2013.01);
(Continued)

(58) Field of Classification Search
None
See application file for complete search history.

(56) References Cited

U.S. PATENT DOCUMENTS 7,116,682 B1 10/2006 Waclawsky et al.
7,433,311 B1 * 10/2008 Kalyanasundaram H04L 41/5029
370/235

(Continued)

FOREIGN PATENT DOCUMENTS

EP 1 484 865 12/2004
EP 2 093 938 8/2009
KR 1020120032949 4/2012

OTHER PUBLICATIONS

European Search Report dated Oct. 13, 2016 issued in counterpart application No. 13880733.4-1857, 8 pages.

*Primary Examiner* — David E Martinez
(74) *Attorney, Agent, or Firm* — The Farrell Law Firm, P.C.

(57) ABSTRACT

Disclosed is a method of managing a connection with a device for a wireless communication-based Wireless universal Serial Bus (WSB) service in a host, including controlling to create an initial channel to connect to a target device for a WSB service, considering a device class of the target device, and configured to create a new channel to substitute for the initial channel considering a particular service, at a user's request, to provide the particular service through association with the target device.

16 Claims, 10 Drawing Sheets

(51) Int. Cl.
  *H04W 76/02* (2009.01)
  *G06F 13/38* (2006.01)
  *G06F 13/42* (2006.01)
  *H04L 12/24* (2006.01)
  *H04W 72/08* (2009.01)

(52) U.S. Cl.
  CPC ......... *H04L 41/0896* (2013.01); *H04W 72/08* (2013.01); *H04W 76/025* (2013.01)

(56) References Cited

U.S. PATENT DOCUMENTS

| | | |
|---|---|---|
| 8,364,083 B2 | 1/2013 | Baek et al. |
| 8,365,306 B2 | 1/2013 | Maes |
| 2007/0073935 A1 | 3/2007 | Kim et al. |
| 2008/0162742 A1 | 7/2008 | Kong et al. |
| 2008/0233930 A1 | 9/2008 | Wurster et al. |
| 2009/0180430 A1 | 7/2009 | Fadell |
| 2010/0069006 A1 | 3/2010 | Baek |
| 2011/0231539 A1 | 9/2011 | Bhesania et al. |
| 2013/0028301 A1 | 1/2013 | Sashittal et al. |

\* cited by examiner

FIG.14

DEVICE FOR PROVIDING WIRELESS COMMUNICATION-BASED UNIVERSAL SERIAL BUS SERVICE AND ASSOCIATED CONNECTION MANAGEMENT METHOD

PRIORITY

This application is a Continuation Application of U.S. application Ser. No. 14/055,419, which was filed in the U.S. Patent & Trademark Office on Oct. 16, 2013, and claims priority under 35 U.S.C. §119(a) to a Korean Patent Application filed in the Korean Intellectual Property Office on Apr. 1, 2013, and assigned Serial No. 10-2013-0035407, the contents of each of which are incorporated herein by reference.

BACKGROUND OF THE INVENTION

1. Field of the Invention

The present invention relates generally to a method and apparatus for providing a wireless communication-based Universal Serial Bus (USB) service.

2. Description of the Related Art

Research is actively being conducted on a Wireless Universal Serial Bus (WSB), to wirelessly use a USB on a cable network. USB is a representative interface standard to connect a Personal Computer and its peripheral devices.

WSB evolved from USB, and employs the Wimedia Media Access Control/PHYsical layer (MAC/PHY) standard based on one of wireless communication technologies for today's Wireless Personal Area Network (WPAN), which may be Multiband Orthogonal Frequency Division Multiplexing.

In conventional WSB technologies, to share information between a host and a device, the host establishes a wireless channel taking only the device class into account. However, maintaining service quality is required regardless of the diverse types of services supported by respective devices. When considering such demand, a scheme for establishing a wireless channel between the host and the device considering a service type has not been yet defined. That is, even if a single device connected to the host via WSB is capable of providing a variety of services, a constant bandwidth is always assigned to all the services regardless of their types, making it difficult to assign the optimum bandwidth for the service.

Therefore, a need exists for a scheme to assign the optimum bandwidth for a service provided by the device connected to the host via WSB.

SUMMARY OF THE INVENTION

The present invention has been made to address at least the above problems and disadvantages and to provide at least the advantages described below. Accordingly, an aspect of the present invention provides a method and apparatus for a host that provides a WSB service to assign or change channels, considering device class and service quality.

An aspect of the present invention also provides a method and apparatus for a host that provides a WSB service to flexibly assign a different channel when a change of a service occurs after assigning a channel to a device.

An aspect of the present invention also provides a method and apparatus for a host that provides a WSB service to immediately reassign a pre-established channel in assigning a channel to a device.

In accordance with an aspect of the present invention, a method of managing a connection with a device for wireless communication includes identifying device information related to the device and included in a message received from the device, allocating, considering the identified device information, a bandwidth to connect to the device for providing a service, and if a change of service type is requested, adjusting the allocated bandwidth considering the changed service type.

In accordance with another aspect of the present invention, a wireless communication device includes aa controller that identifies device information related to a device and included in a message received from the device, that allocates, considering the identified device information, a bandwidth to connect to the device for providing a service, and that adjusts, if a change of service type is requested, the allocated bandwidth considering the changed service type, and a channel create unit that creates a channel to connect to the device based on the allocated bandwidth or the adjusted bandwidth under control of the controller.

BRIEF DESCRIPTION OF THE DRAWINGS

The above and other aspects, features, and advantages of embodiments of the present invention will be more apparent from the following description taken in conjunction with the accompanying drawings in which.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded merely as examples. Accordingly, those of ordinary skill in the art will recognize that various changes and modifications of the embodiments described herein can be made without departing from the scope and spirit of the invention. In addition, descriptions of well-known functions and constructions may be omitted for the sake of clarity and conciseness.

The terms and words used in the following description and claims are not limited to their dictionary meanings, but are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various schemes to change a bandwidth initially assigned considering a device class to a new channel considering a selected service type in a host that supports WSB, will now be described in detail.

A host obtains a device class from the device to be connected via WSB, and performs a process of creating an initial channel by assigning bandwidth to meet service quality required for the device class. After that, the host determines whether a desired service may be provided using the assigned bandwidth based on service-related information provided by the device, and performs a new channel-creating process by assigning new bandwidth based on the determination.

Bandwidth assignment herein refers to creating a channel for data transfer. The new channel-creating process may include assigning a new channel after releasing old bandwidth, or assigning additional necessary bandwidth while maintaining the old bandwidth.

Bandwidth for the new channel may be wider or narrower than that for the initial channel, as necessary. For example, if excessively wide bandwidth was assigned for the initial channel, narrower bandwidth was assigned to reduce battery consumption due to assignment of unnecessarily excessive bandwidth.

Figure 1:
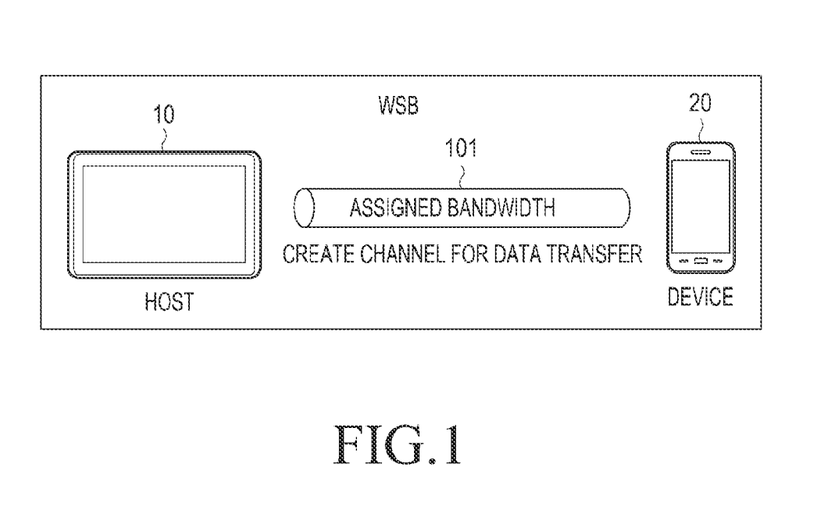
FIG. 1 illustrates a conventional WSB system in which a host and a device are connected via WSB in an initial channel creation process.

FIG. 1 illustrates a conventional WSB system in which a host and a device are connected via WSB in an initial channel creation process.

Referring to FIG. 1, a host 10 collects information about a device class of a device to be connected via WSB. The host 10 may receive the information about the device class from the device 20. The device class is a USB type defined by the USB-Implementers Forum (USB IF), including Human Interface Device (HID) class for keyboards and mice, Mass-Storage device Class (MSC) and Media Transfer Protocol (MTP) class for USB Hard Disk Drives (USB HDDs).

The host 10 determines a service quality for the device class and assigns bandwidth to meet the service quality. For example, if the device class is MSC, the host 10 assigns bandwidth to meet an optimum effort service quality for bulk data transfer.

With this bandwidth assignment, a channel 101 with the assigned bandwidth is created for data transfer between the host 10 and the device 20. That is, WSB connection is established between the host 10 and the device 20 with the assigned bandwidth.

The channel 101 that connects the host 10 and the device 20 is maintained until the connection is terminated.

Figure 2:
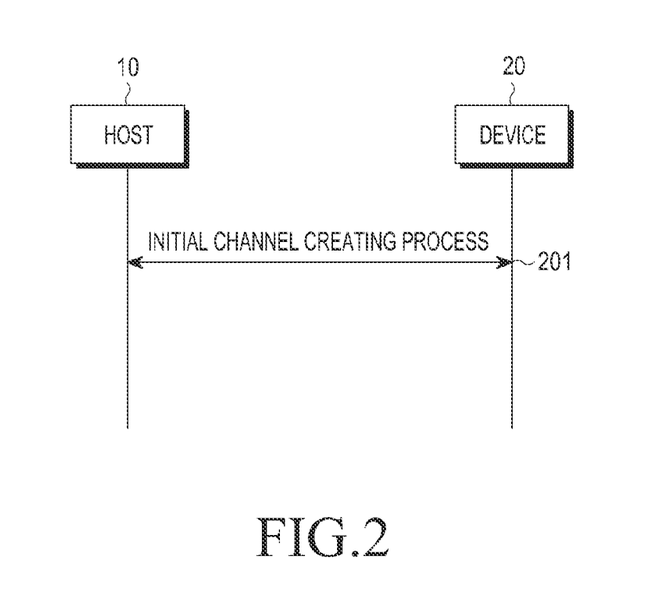
FIG. 2 illustrates a process of creating an initial channel to connect a host and a device via WSB in a conventional WSB system.

FIG. 2 illustrates a process of creating an initial channel to connect a host and a device via WSB in a conventional WSB system.

Referring to FIG. 2, bandwidth is assigned between the host 10 and the device 20 using the information about the device class, so that an initial channel is created that corresponds to the device class, in step 201.

Figure 3:
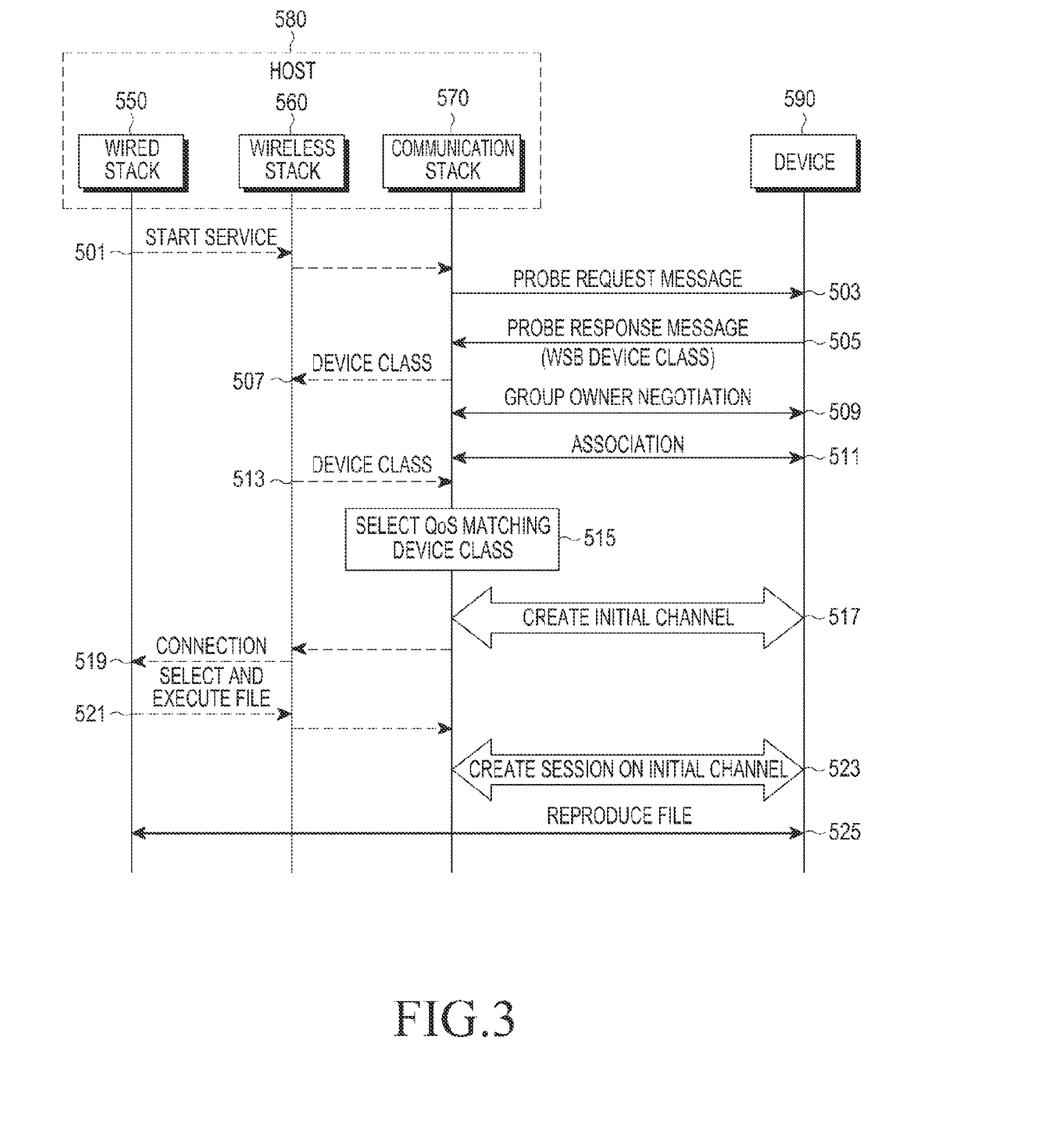
FIG. 3 illustrates a process of creating a new channel between a host and a device in a conventional WSB system.

FIG. 3 illustrates a process of creating a new channel between a host and a device in a conventional WSB system. In FIG. 3, although not limited hereto, a host 580 is assumed to include a wired stack 550, a wireless stack 560, and a communication stack 570.

The wired stack 550 sends a service start message to the communication stack 570 through the wireless stack 560, in step 501.

The communication stack 570 sends a probe request message to a device 590 in response to the service start message, in step 503. The probe request message is for requesting information about a device class.

The device 590 sends a probe response message to the communication stack 570 in response to the probe request message, in step 505. The probe response message includes the information about the device class.

The communication stack 570 sends the information about the device class to the wireless stack 560, in step 507. The wireless stack 560 then identifies the device class of the device 590. The host 580 performs Group Owner Negotiation with the device 590 in step 509, and associates with the device based on the result of the Group Owner Negotiation in step 511.

The wireless stack 560 sends the information about the device class to the communication stack 570, in step 513. The communication stack 570 selects service quality that is matched by the device class, in step 515. The host 580 creates an initial channel with the device 590 based on the selected service quality, in step 517. With the initial channel, the wireless stack 560 establishes a connection with the wired stack 550, in step 519. The wired stack 550 selects a file to run a service, in step 521. The communication stack 570 then creates a session with the device 590 via the initial channel, in step 523. The host 580 reproduces a file provided by the device 590, in step 525.

Steps 501, 507, 513, 515, 519, and 521 are message-exchanging operations performed among stacks inside the host 580, while steps 503, 505, 509, 511, 517, 523, and 525 are message-exchanging operations performed between the host 580 and the device 590.

Figure 4:
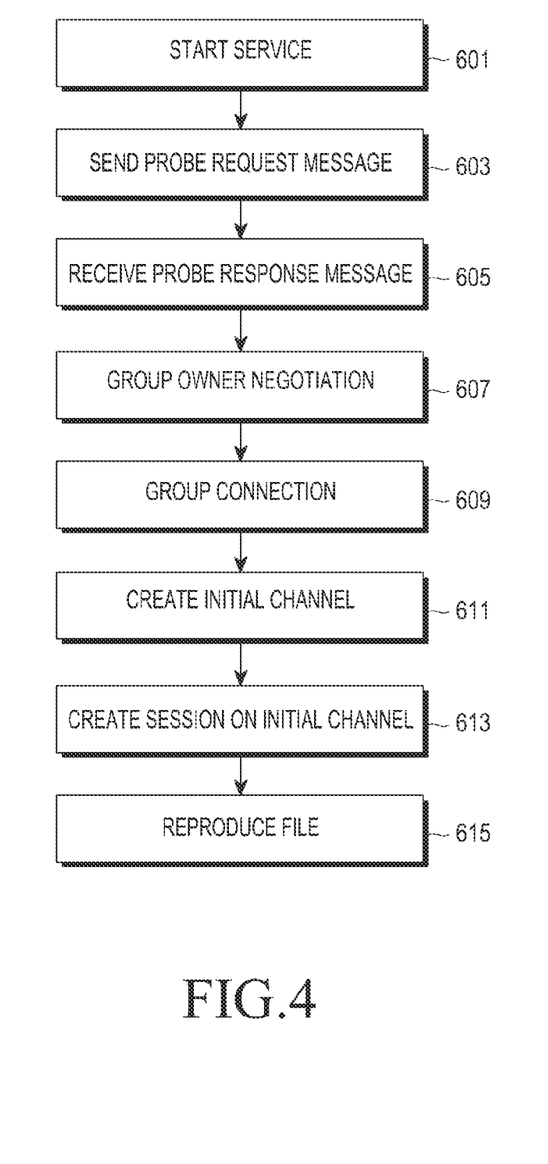
FIG. 4 illustrates controlling creation of an initial channel in a host of a conventional WSB system.

FIG. 4 illustrates controlling initial channel creation in a host of a conventional WSB system.

Referring to FIG. 4, the host starts a service to connect to a device via WSB, in step 601.

The host then sends a probe request message to the device, in step 603.

The host, in return, receives a probe response message from the device, in step 605. The probe response message includes information about a device class of the device.

The host negotiates with the device about Group Owner (GO) in step 607, and based on the negotiation result, connects with the device in step 609.

After connection with the device, the host assigns bandwidth for an initial channel based on the device class that was identified from the probe response message, in step 611.

Specifically, the host determines a service quality that corresponds to the device class, and then creates the initial channel by assigning bandwidth that meets the service quality.

A mapping table may be used to determine the service quality. The mapping table is set to define a service quality for each device class, enabling the host to select proper service quality for the device class identified from the probe response message.

After creation of the initial channel, the host creates a session with the device on the initial channel, in step 613.

The host then receives a file from the device in the session and reproduces the file, in step 615.

Figure 5:
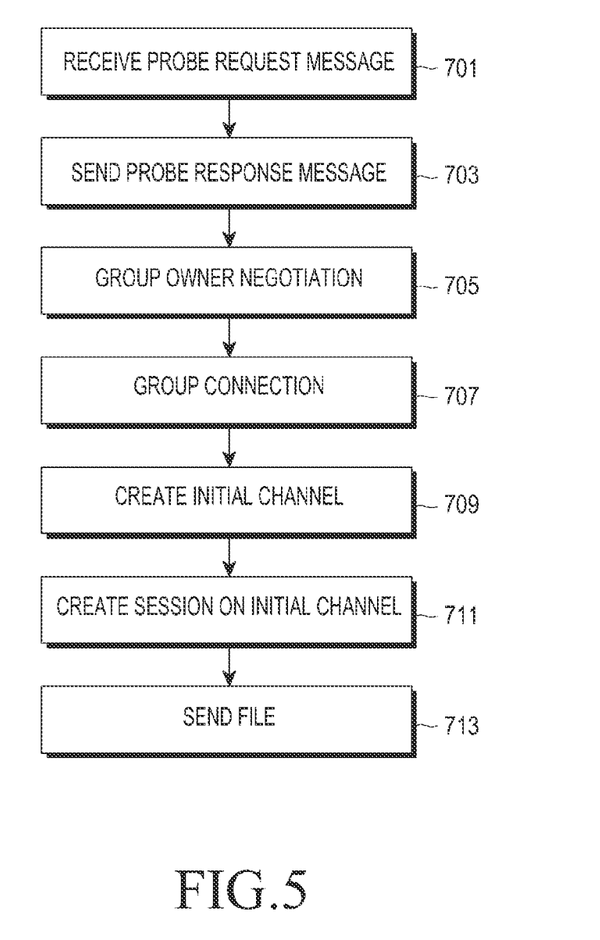
FIG. 5 illustrates controlling creation of an initial channel with a host of a conventional WSB system, which is performed by a device.

FIG. 5 illustrates controlling to create an initial channel with a host of a conventional WSB system, which is performed by a device.

Referring to FIG. 5, a device receives a probe request message from a host, in step 701. Upon receipt of the probe request message, the device considers it as a request for information about a device class.

The device sends a probe response message in response to the request probe message, in step 703. The probe response message includes information about a device class of the device. The device performs Group Owner Negotiation with the host in step 705, and based on the negotiation result, connects with the host in step 707. The device creates an initial channel using bandwidth assigned from the host, in step 709. The device creates a session with the host on the initial channel, in step 711. The device sends the host a file selected by the host in the session, in step 713.

An embodiment will now be described in connection with FIGS. 6 to 10. In the embodiment, a host and a device create an initial channel, and then create a new channel considering a quality of a particular service if additional bandwidth is required. Specifically, if the user changes the service or starts a new service since the initial channel has been created, a new channel and a new session are established to correspond to the changed service or the new service, as shown in FIG. 7.

Although not shown, it is assumed that a particular service is requested to be provided through association with the target device since the initial channel has been created.

Figure 6:
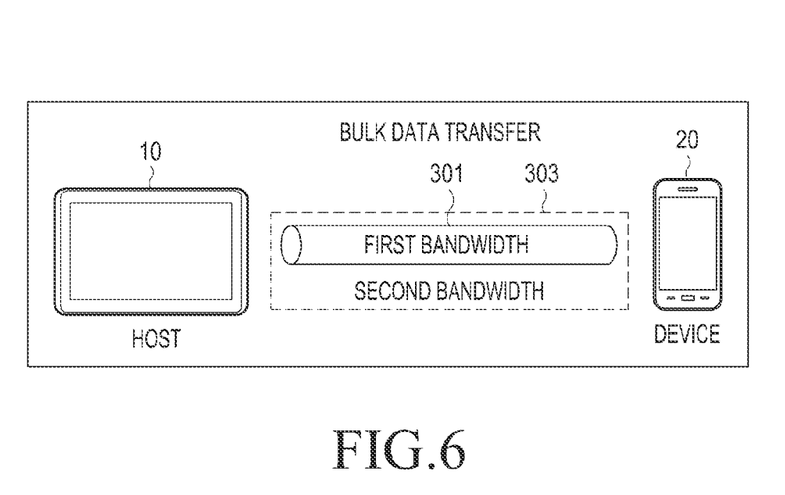
FIG. 6 illustrates a scenario of connecting a host and a device in a WSB system, according to an embodiment of the present invention.
Figure 7:
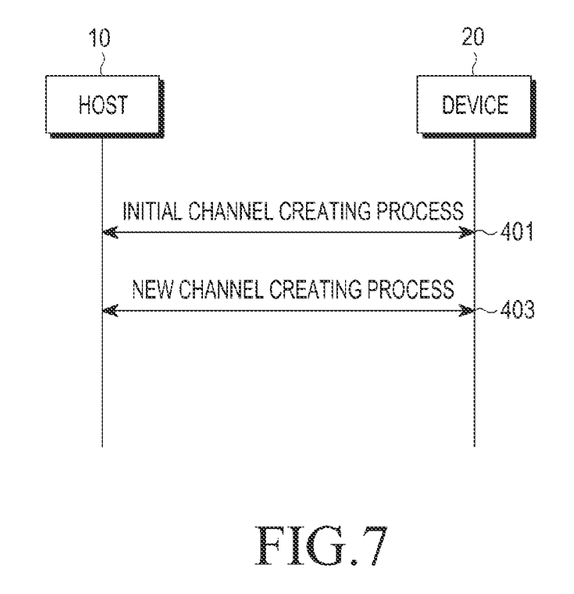
FIG. 7 illustrates a procedure of connecting a host and a device via WSB in a WSB system, according to an embodiment of the present invention.

FIG. 6 illustrates a scenario of connecting a host and a device in a WSB system, according to an embodiment of the present invention.

In FIG. 6, to connect the host 10 and the device 20, an initial channel is created considering a device class of the device 10, and then a new channel is created considering a request for a particular service or a change of the existing service. The initial channel creation refers to assigning initial bandwidth, first bandwidth 301, and the new channel creation refers to assigning new bandwidth, second bandwidth 303.

Referring to FIG. 6, the host 10 assigns the first bandwidth 301 considering a device class collected from the device 20, which may be performed in the same process as illustrated in FIG. 1.

The host 10 monitors whether a particular service is selected or a change of the existing service is requested by the user. If a particular service has been selected or a change of the existing service has been requested, the host 10 determines service quality required for the particular service or a replacement service. The host 10 then determines whether the service quality is satisfied with the first bandwidth 301 currently assigned.

If the service quality is not satisfied with the first bandwidth 301, the host 10 assigns the second bandwidth 303 to satisfy the service quality. Failing to meet the service quality occurs when the particular service or the replacement service requires wider bandwidth compared with an old or previous service.

More specifically, the first bandwidth 301 is assigned for bulk transfer, which is used to connect the host 10 and the device 20 (e.g., a wireless HDD) via WSB. If the user 25 requests to reproduce video content stored in the wireless HDD 20, a service to reproduce the video content may not meet a desired service quality if the service is provided with the first bandwidth 301. Thus, the host 10 assigns the second bandwidth to provide the service to reproduce the video content with the desired service quality.

The second bandwidth 303 may be newly assigned after the first bandwidth 301 is released, or may be assigned by being added to the first bandwidth as necessary. Furthermore, although not shown, the second bandwidth may be assigned by reducing the first bandwidth as necessary if the first bandwidth has been excessively assigned.

FIG. 7 illustrates a process of connecting a host and a device via WSB in a WSB system, according to an embodiment of the present invention. There is an initial channel-creating step 401 for assigning bandwidth to meet channel quality required for a device class, and a new channel-creating step 403 for assigning bandwidth to meet service quality required for a service to be provided.

More specifically, the host 10 and the device 20 perform the initial channel-creating step 401 for assigning first bandwidth. For this, the host 10 needs to receive information about a device class from the device 20. However, receiving information about the device class from the device 20 may be skipped if the host 10 already knows the device class of the device 20.

If a service selected by a user of the host 10 requires wider bandwidth than the first bandwidth currently assigned, the host 10 performs the new channel-creating process 403 for the selected service.

In other words, when a particular service is requested by the user to be provided through association with the device 20 since the initial channel has been created, the host 10 creates a new channel different from the initial channel, considering the particular service. At least one of service quality and bandwidth of the new channel is different that of the initial channel.

In an embodiment described below, a host includes a wired stack, a wireless stack, and a communication stack. The wired stack may be a USB stack that uses the USB protocol, the communication stack may be a Wi-Fi stack that is based on a protocol specified in the Wi-Fi Peer-to-Peer (Wi-Fi P2P) standard to provide direct connection between Wi-Fi devices, and the wireless stack may use the adaption layer protocol to connect the wired stack and the communication stack.

Figure 8:
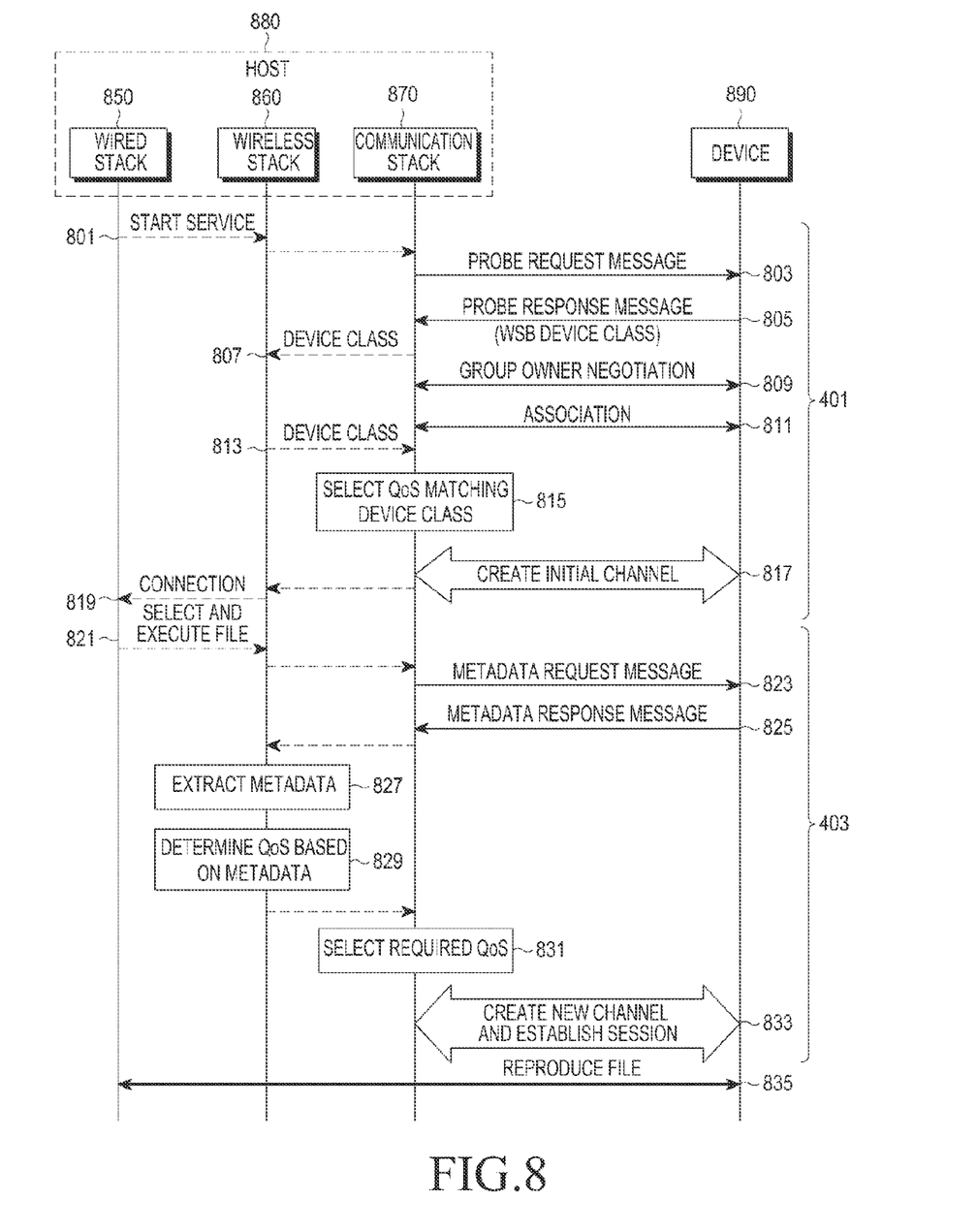
FIG. 8 illustrates a signal processing process configured to create an initial channel between a host and a device in a WSB system, according to an embodiment of the present invention.

FIG. 8 illustrates a signal processing process for creating a new channel between a host and a device in a WSB system, according to an embodiment of the present invention.

In FIG. 8, steps 801 to 819 for creating the initial channel are the same as steps 501 to 519 of FIG. 3, and thus a detailed description thereof will be omitted.

When a user selects a file for a particular service, file information is provided to a wired stack 850 of a host 880. The wired stack 850 forwards the file information to a wireless stack 860 in step 821, which in turn forwards the file information to a communication stack 870.

The communication stack 870 then configures a metadata request message to include the file information and sends the metadata request message to a device 890, in step 823. The metadata request message includes information about a service to request metadata (e.g., the file information).

Upon receipt of the metadata request message from the host 880, the device 890 sends a metadata response message to the host 880, in step 825. The metadata response message includes metadata that corresponds to the service requested by the host 880.

Upon receipt of the metadata response message, the host 880 selects the proper service quality considering the metadata included in the metadata response message.

Specifically, the communication stack 870 of the host 880 forwards the metadata response message to the wireless stack 860. The wireless stack 860 extracts the metadata from the metadata response message, in step 827. The wireless stack 860 determines service quality required for the service based on the metadata, in step 829. The communication stack 870 receives the determination result about the service quality from the wireless stack 860, and selects the service quality for the service based on the determination, in step 831.

The communication stack 870 creates a new channel that satisfies the selected service quality and establishes a session, in step 833. The new channel satisfying the selected service quality indicates that the new channel has as much bandwidth as to provide a desired service with the selected service quality.

The host 880 reproduces a file provided by the device 890, in step 835.

As such, the host 880 creates the new channel based on the metadata information of the file selected by the user since the initial channel has been created based on the device class. Although not shown, the initial channel may be released after the new channel is created.

Steps 801, 807, 813, 815, 819, 821, 827, 829, and 831 are performed among stacks within the host 880, while steps 803, 805, 809, 811, 817, 823, 825, 833, and 835 are performed between the host 880 and the device 890.

If the particular service is a video playing service, the information about the particular service may be metadata of the video.

Figure 9:
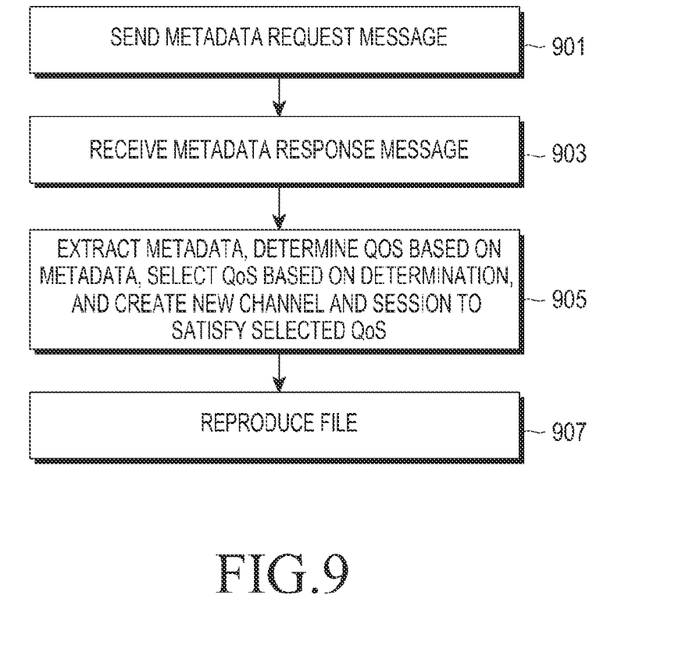
FIG. 9 illustrates host operations, according to an embodiment of the present invention.

FIG. 9 illustrates host operations, according to an embodiment of the present invention.

In FIG. 9, detailed description of a step configured to create the initial channel is omitted since this step is described in relation to FIG. 4.

When requested by the user to provide a particular service, the host sends a metadata request message to the device to request metadata of a particular service, in step 901. In return, the host receives from the device a metadata response message that includes metadata of the particular service, in step 903.

The host extracts the metadata from the metadata response message. The host determines service quality for the particular service based on the metadata. The host creates a new channel by assigning bandwidth required to provide the particular service with the determined service quality, and creates a new session to exchange data for the particular service on the new channel, in step 905.

The host is provided with a file associated with the particular service from the device in the session of the new channel, and reproduces the file, in step 907.

Figure 10:
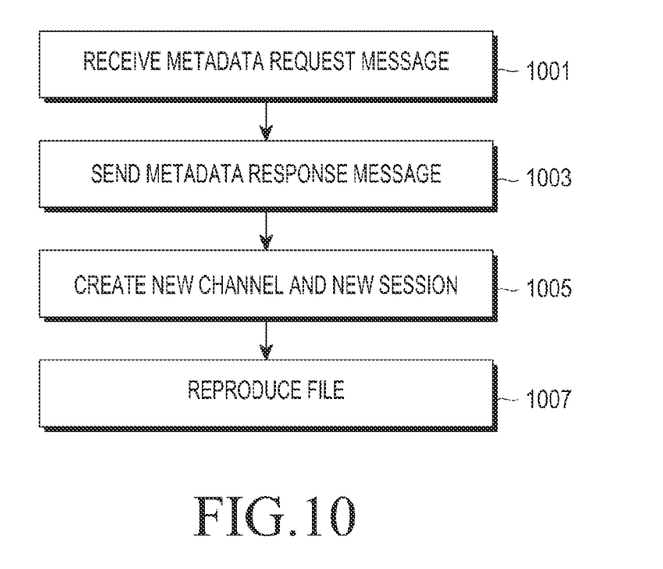
FIG. 10 illustrates device operations, according to an embodiment of the present invention.

FIG. 10 illustrates device operations, according to an embodiment of the present invention.

In FIG. 10, the step of creating the initial channel with the host, which is performed by the device, is omitted since this step was described with respect to FIG. 5.

The device receives a metadata request message from the host, in step 1001. The metadata request message includes information about a service selected by the host (e.g., information about a selected file).

Upon reception of the metadata request message that includes information about the service, the device determines that metadata for the service included in the metadata request message is requested. The device then configures a metadata response message to include the metadata for the service and sends the metadata response message to the host, in step 1003.

The device creates a new channel with bandwidth assigned for the service selected by the host, and creates a new session on the new channel, in step 1005.

The device sends a file selected by the host in the new session on the new channel for the host, and reproduces the file, in step 1007.

Figure 11:
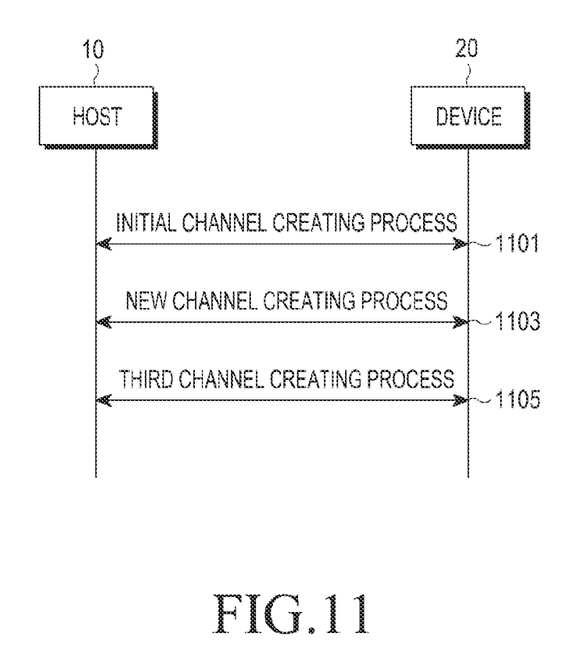
FIG. 11 illustrates WSB-based connection between a host and a device according to different channel procedures, according to an embodiment of the present invention.

FIG. 11 illustrates WSB-based connection between a host and a device according to third channel processes, according to an embodiment of the present invention.

Referring to FIG. 11, the host 10 performs the initial channel creation process by obtaining information about a device class of the device 200, in step 1101.

If a service selected by the user requires more bandwidth than initial bandwidth assigned based on a device class after the initial channel-creating step is created, the host 10 performs a new channel creation process for the service, in step 1103.

At the user's request for change into another service after the new channel is created, the host 10 performs a third channel-creating process 1105 for the another service.

The another service is different from the previous service. For example, service quality for the another service is different from that for the previous service, indicating that bandwidth of the third channel to be created for the another service is different from bandwidth of the new channel for the previous service. The third channel's bandwidth may be wider or narrower than the new channel's bandwidth.

Figure 12:
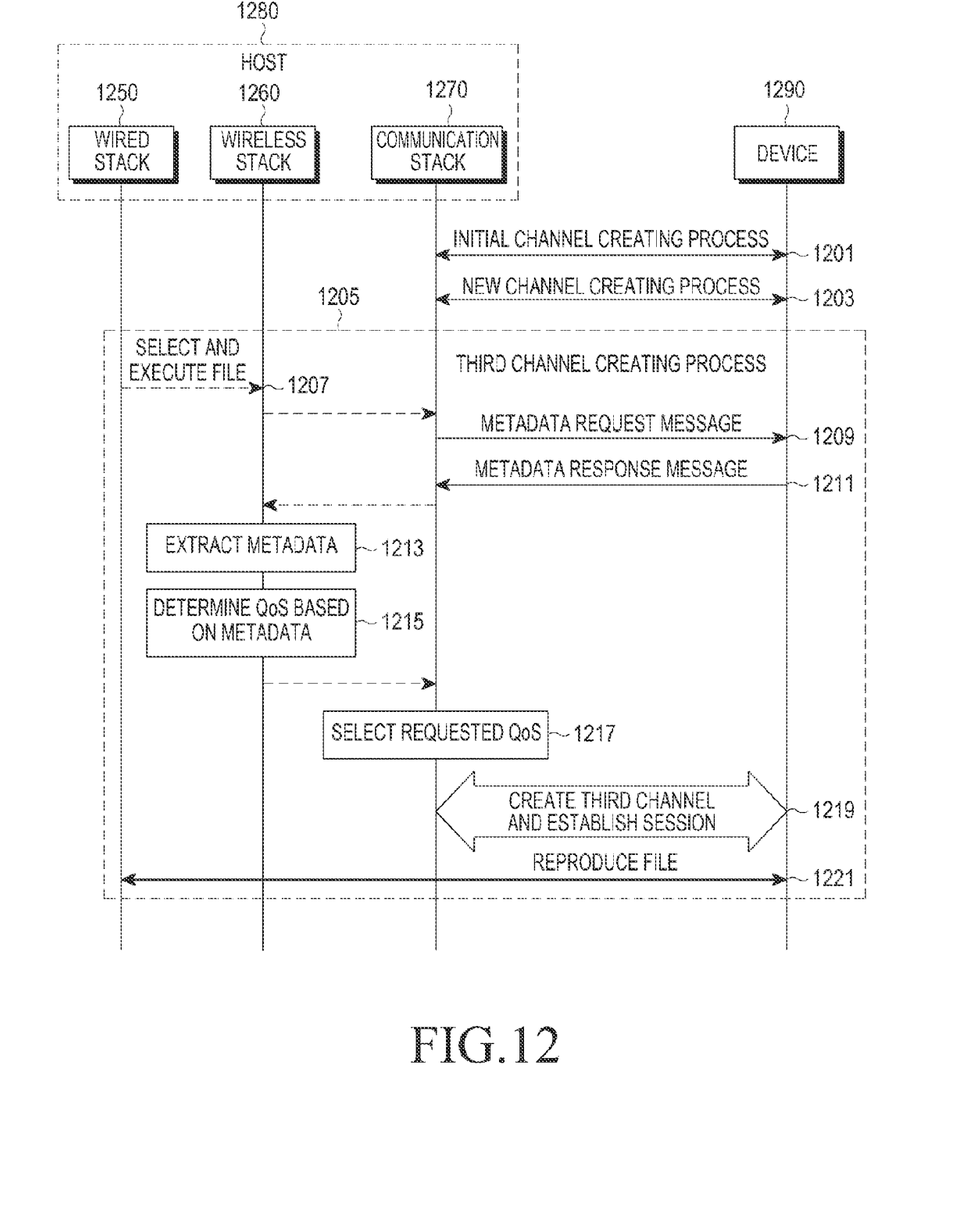
FIG. 12 illustrates procedure of creating a third channel between a host and a device, according to an embodiment of the present invention.

FIG. 12 illustrates a procedure of creating a third channel between a host and a device, according to an embodiment of the present invention.

In FIG. 12, an initial channel creation process 120 and a new channel creation process 1203, which are the same as those described in FIGS. 3 and 8, will not be described.

When a user requests to change a service to another service, i.e., to change a file that is currently being reproduced to another file while the service is being provided, information of the another file is provided to a wired stack 1250 of a host 1280. The wired stack 1250 forwards the information of the another file to a wireless stack 1260 in step 1207, and the wireless stack 1260 in turn forwards the information of the another file to a communication stack 1270.

The communication stack 1270 then configures a metadata request message to include the information of the another file and sends the metadata request message to a device 1290, in step 1209. The metadata request message includes information about a service to request metadata (e.g., the information of the another file).

Upon receipt of the metadata request message from the host 1280, the device 1290 sends a metadata response message to the host 1280, in step 1211. The metadata response message includes metadata that corresponds to the another file requested by the host 1280.

Upon receipt of the metadata response message, the host 1280 selects proper quality for the service, considering the metadata included in the metadata response message.

Specifically, the communication stack 1270 of the host 1280 forwards the metadata response message to the wireless stack 1260, which extracts the metadata from the metadata response message, in step 1213, and determines QoS required for the another service based on the metadata, in step 1215. The communication stack 1270 receives the determination result about the service quality from the wireless stack 1260, and selects service quality for the another service based on the determination, in step 1217.

The communication stack 1270 creates a third channel that satisfies the selected service quality and establishes a session, in step 1219. The third channel satisfying the selected service quality indicates that the third channel has enough bandwidth to provide a desired service with the selected service quality.

The host 1280 receives a file requested for change from the device 1290 and reproduces the file, in step 1221.

Although not shown, the host 1280 may release the new channel and the initial channel after creating the third channel. If the another service is a video playing service, the information about the service implies a request for metadata of the video.

Figure 13:
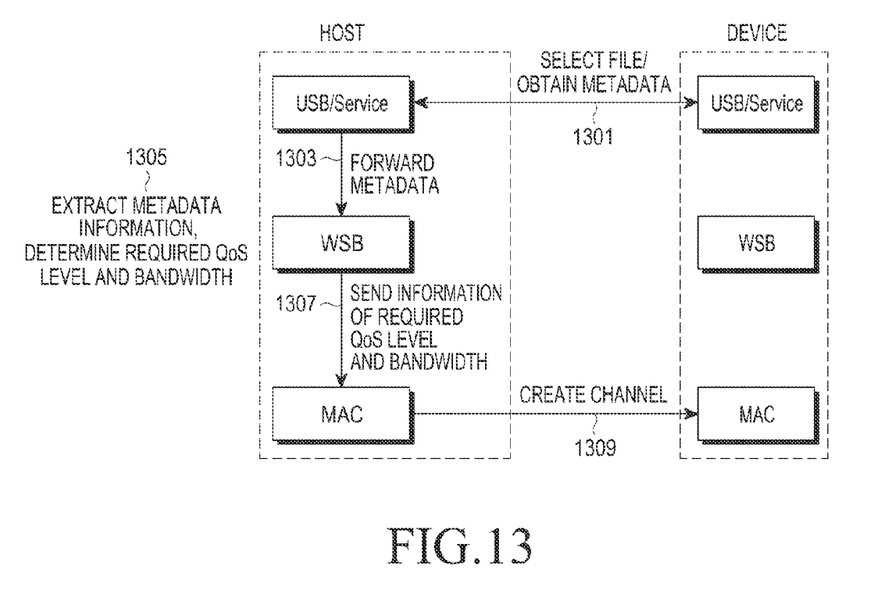
FIG. 13 illustrates protocol relations between a host and a device from the perspective of a communication stack, according to an embodiment of the present invention.

FIG. 13 illustrates protocol relations between a host and a device from the perspective of a communication stack, according to an embodiment of the present invention.

Referring to FIG. 13, the host and the device are each comprised of USB/Service, WSB, and MAC. The MAC refers to a WiFi MAC, and the USB/Service refers to a service protocol to provide a USB service in the MAC.

The USB/Service of the host sends information about a selected file to the USB/Service of the device, which in turn provides metadata obtained based on the information about the selected file to the USB/Service of the host, in step 1301. As an operation of step 1301, the USB/Service of the host sends a metadata request message that request metadata of a particular service to the USB/Service of the device. In response, the USB/Service of the device sends a metadata response message that includes a metadata of the particular service to the USB/Service of the host.

The USB/Service of the host forwards the metadata included in the metadata response message to the WSB of the host, in step 1303.

The WSB extracts metadata information from the metadata, and determines a service quality and bandwidth required for executing the selected file, considering the metadata information, in step 1305. That is, the WSB extracts the metadata information about service features from the metadata, and determines required service quality and bandwidth. The metadata information about service features includes, for example, information regarding encoding rate, codec, and audio.

The WSB sends information of the determined service quality level and bandwidth to the MAC of the host, in step 1307.

The MAC of the host creates a channel with the MAC of the device based on the information of the service quality level and bandwidth, in step 1309.

Although, for convenience of explanation, it is illustrated as if the USB/Service of the host and the USB/Service of the device select a file and obtain metadata, actual data transmission/reception is performed by MACs of the host and the device.

Figure 14:
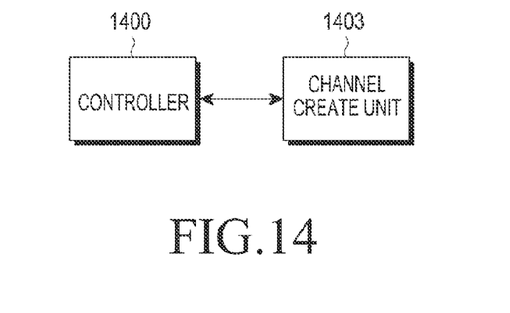
FIG. 14 illustrates a host, according to an embodiment of the invention.

FIG. 14 illustrates a host, according to an embodiment of the invention. In FIG. 14, only the primary components configured to create the WSB based channels are illustrated while others are eliminated. Accordingly, the host includes a controller 1400 and a channel create unit 1403.

Referring to FIG. 14, the controller 1400 controls the channel create unit 1403 to create an initial channel to connect to a target device for a WSB service, considering a device class of the target device. When requested to provide a particular service through association with the target device since the initial channel has been created, the controller 1400 controls the channel create unit 1403 to create a new channel to substitute for the initial channel, considering the particular service.

In addition, when the controller 1400 detects that another service is requested to be provided through association with the target device since the new channel has been created, the controller 1400 controls the channel create unit 1403 to create third channel to substitute for the new channel, considering the another service.

The channel create unit 1403 creates the initial channel considering only the device class, such as a type of the service to be provided, or creates the third channel considering a change of the service, for example.

More detailed operations of the controller 1400 and the channel create unit 1403 may be inferred in accordance with those described above.

In the embodiments, it was assumed that the initial channel, the new channel, and the third channel have at least one of service quality and bandwidth that are different from one another. Alternatively, the host may include its own memory to store and manage the information about the service and the information about the device class, which are obtained according to the foregoing embodiments, and assign channels to achieve the same objective based on the information in the memory. In this case, without performing processes of obtaining metadata of a particular service, selecting service quality and the like, it is possible to assign bandwidth to meet the quality of the particular service.

According to the present invention, areas of content reproduction may be increased by collecting channel bandwidth information required to reproduce the content.

Furthermore, deterioration of service quality that could occur in a change of service is avoided.

Several embodiments have thus been described, but it will be understood that various modifications can be made without departing the scope of the present invention. Thus, it will be apparent to those ordinary skilled in the art that the invention is not limited to the embodiments described, but can encompass not only the appended claims but the equivalents.

What is claimed is:

1. A method of managing a connection with a device for wireless communication, the method comprising:
    receiving, from the device, device information comprising a device class of the device;
    allocating a bandwidth to connect to the device for providing a service, based on the device class; and
    if a service type is changed, adjusting the allocated bandwidth considering the changed service type.

2. The method of claim 1, wherein the device information is received within a message that is used for an initial connection with the device.

3. The method of claim 1, wherein the device information is received within a probe response message.

4. The method of claim 1, wherein allocating the bandwidth comprises:
   selecting a service quality that is matched by the received device class; and
   allocating the bandwidth based on the selected service quality.

5. The method of claim 4, further comprising creating a session with the device using the allocated bandwidth.

6. The method of claim 1, further comprising:
   determining whether the service may be provided using the allocated bandwidth based on service-related information provided by the device; and
   adjusting the allocated bandwidth according to a result of the determination.

7. The method of claim 1, wherein the device class includes at least one of a human interface device class, a mass-storage device class, and a media transfer protocol class.

8. The method of claim 1, wherein adjusting the allocated bandwidth comprises:
   receiving the service type change request from the device;
   determining a service quality corresponding to the changed service type;
   determining whether the determined service quality is satisfied with the allocated bandwidth; and
   if the determined service quality is not satisfied with the allocated bandwidth, adjusting the allocated bandwidth to a bandwidth that is satisfied with the service quality.

9. A wireless communication device, comprising:
   a controller that receives, from the device, device information comprising a device class of the device, that allocates a bandwidth to connect to the device for providing a service, based on the device class, and that adjusts, if a service type is changed, the allocated bandwidth considering the changed service type; and
   a channel create unit that creates a channel to connect to the device based on the allocated bandwidth or the adjusted bandwidth under control of the controller.

10. The wireless communication device of claim 9, wherein the device information is received within a message that is used for an initial connection with the device.

11. The wireless communication device of claim 9, wherein the device information is received within a probe response message.

12. The wireless communication device of claim 9, wherein the controller further selects a service quality that is matched by the received device class, and allocates the bandwidth based on the selected service quality.

13. The wireless communication device of claim 12, wherein the channel create unit further creates a session with the device using the allocated bandwidth.

14. The wireless communication device of claim 9, wherein the controller further determines whether the service may be provided using the allocated bandwidth based on service-related information provided by the device, and adjusts the allocated bandwidth according to a result of the determination.

15. The wireless communication device of claim 9, wherein the device class includes at least one of a human interface device class, a mass-storage device class, and a media transfer protocol class.

16. The wireless communication device of claim 9, wherein the controller further receives the service type change request from the device, determines a service quality corresponding to the changed service type, determines whether the determined service quality is satisfied with the allocated bandwidth, and if the determined service quality is not satisfied with the allocated bandwidth, adjusts the allocated bandwidth to a bandwidth that satisfies the service quality.

* * * * *